United States Patent
Maeda

(10) Patent No.: US 7,136,744 B2
(45) Date of Patent: Nov. 14, 2006

(54) NAVIGATION SYSTEM, METHOD THEREOF, PROGRAM THEREOF AND RECORDING MEDIUM STORING THE PROGRAM

(75) Inventor: Hidenori Maeda, Tokyo (JP)

(73) Assignee: Increment P Corporation, Tokyo (JP)

( * ) Notice: Subject to any disclaimer, the term of this patent is extended or adjusted under 35 U.S.C. 154(b) by 237 days.

(21) Appl. No.: 10/736,547

(22) Filed: Dec. 17, 2003

(65) Prior Publication Data

US 2004/0172189 A1    Sep. 2, 2004

(30) Foreign Application Priority Data

Jan. 22, 2003    (JP)    ............... 2003-013899

(51) Int. Cl.
*G01C 21/26*    (2006.01)
(52) U.S. Cl. .............. 701/200; 701/205; 701/25
(58) Field of Classification Search ........ 701/200–202, 701/205, 207–211, 213, 24–26; 342/357.01, 342/357.13; 340/988, 995.21, 995.1
See application file for complete search history.

(56) References Cited

U.S. PATENT DOCUMENTS

| 6,154,152 A | 11/2000 | Ito ............... 340/988 |
| 6,553,309 B1* | 4/2003 | Uchida et al. ............. 701/208 |
| 6,600,993 B1* | 7/2003 | Kaneko et al. ............ 701/208 |
| 2002/0128768 A1 | 9/2002 | Nakano et al. ............. 701/202 |
| 2002/0165665 A1 | 11/2002 | Kim .......................... 701/209 |

FOREIGN PATENT DOCUMENTS

| EP | 0 869 466 A1 | 10/1998 |
| JP | 3332225 | 2/2001 |
| JP | 2001-519029 | 10/2001 |

OTHER PUBLICATIONS

Cover page of WO 98/45823 document published Oct. 15, 1998.
European Search Report dated Apr. 23, 2004.

* cited by examiner

*Primary Examiner*—Y. Beaulieu
(74) *Attorney, Agent, or Firm*—Armstrong, Kratz, Quintos, Hanson & Brooks, LLP

(57) ABSTRACT

Provided is a navigation system that can realize preferable navigation. A server unit (400) recognizes current position information and destination information sent from a terminal unit (300) over a network (200) and searches for a travel route utilizing matching data in map information. The server unit (400) sends matching mesh information and a travel route to the terminal unit (300), the matching mesh information including nodes and links that represent a road corresponding to the travel route. The terminal unit (300) navigates a vehicle on the basis of the current position information, the matching mesh information, and information on the travel route. When the current position is off the travel route, the terminal unit (300) performs rerouting on the basis of the matching mesh information that has been acquired. If the terminal unit (300) can not perform rerouting, the server unit (400) performs rerouting. Thus, prompt and smooth navigation based on a new travel route can be achieved.

9 Claims, 9 Drawing Sheets

FIG. 6

| TRAFFIC CONTROLS · LINK ATTRIBUTE (1) | bit7 | bit6 | bit5 | DESCRIPTION |
|---|---|---|---|---|
| | 0 | 0 | 0 | RESERVE |
| | 0 | 0 | 1 | TWO-WAY MAIN ROAD |
| | 0 | 1 | 0 | TWO-WAY FEEDER ROAD |
| | 0 | 1 | 1 | TWO-WAY SIDE ROAD |
| | 1 | 0 | 0 | ONE-WAY MAIN ROAD |
| | 1 | 0 | 1 | ONE-WAY FEEDER ROAD |
| | 1 | 1 | 0 | ONE-WAY SIDE ROAD |
| | 1 | 1 | 1 | ROAD CLOSED |

| DEFAULT ROAD WIDTH | bit4 | DESCRIPTION |
|---|---|---|
| | 0 | UNDER 5.5M |
| | 1 | 5.5M OR MORE |

| LINK TYPE | bit3 | bit2 | bit1 | bit0 | DESCRIPTION |
|---|---|---|---|---|---|
| | 0 | 0 | 0 | 0 | NATIONAL ROAD |
| | 0 | 0 | 0 | 1 | MAJOR REGIONAL ROAD |
| | 0 | 0 | 1 | 0 | STATE ROAD |
| | 0 | 0 | 1 | 1 | PUBLIC ROAD |
| | 0 | 1 | 0 | 0 | MINOR STREET |
| | 0 | 1 | 0 | 1 | MINOR STREET 2 |
| | 0 | 1 | 1 | 0 | INTERCITY HIGHWAY |
| | 0 | 1 | 1 | 1 | URBAN HIGHWAY |
| | 1 | 0 | 0 | 0 | TOLL NATIONAL ROAD |
| | 1 | 0 | 0 | 1 | TOLL MAJOR REGIONAL ROAD |
| | 1 | 0 | 1 | 0 | TOLL STATE ROAD |
| | 1 | 0 | 1 | 1 | OTHER TOLL ROAD |
| | 1 | 1 | 1 | 0 | ROAD EXCEPT FERRY ROUTE |
| | 1 | 1 | 1 | 1 | FERRY ROUTE |

FIG. 8

| | NODE FLAG | | DESCRIPTION |
|---|---|---|---|
| | | bit15 | |
| Nxn | | 0 | NOT IDENTICAL |
| | | 1 | IDENTICAL |
| | X-COORDINATE OFFSET | | |
| | Y-COORDINATE OFFSET | | |
| Nxn+1 | | | |

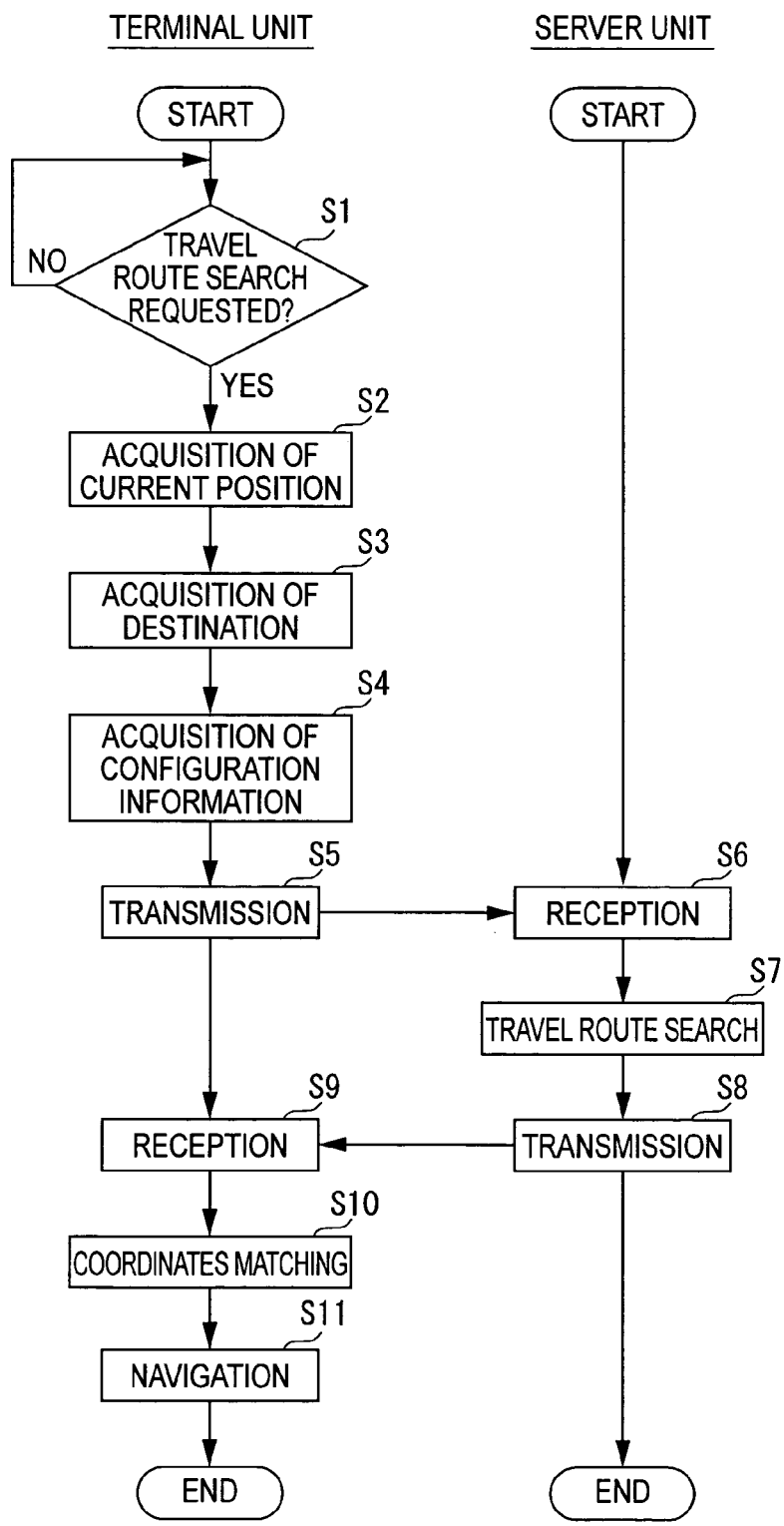

NAVIGATION SYSTEM, METHOD THEREOF, PROGRAM THEREOF AND RECORDING MEDIUM STORING THE PROGRAM

BACKGROUND OF THE INVENTION

1. Field of the Invention

The present invention relates to a navigation system that distributes map information for informing progress of a movable body over a network, a system thereof, a method thereof, a program thereof, and a recording medium storing the program.

2. Description of Related Art

Communication-based navigation systems conventionally known are that acquire map information stored in sever units via communication by using mobile communication terminals such as an on-board or portable navigation apparatus, a PDA (Personal Digital Assistant), a mobile phone, a PHS (Personal Handyphone System), and a portable personal computer so as to search for information on a current position and routes to a destination location, and to retrieve information on nearby shops. In such communication-based navigation system, since the management of map information with enormous data volume is centralized at a server unit, a mobile terminal need not to have a storage section for storing the map information. Thus, simplification of the configuration and reduction in size and weight are easily realized while most-updated map information is readily provided. For the purpose of smooth operation and management of the data, the map information is constituted by a plurality of digitalized map files that are divided into a plurality of areas.

Typically, when displaying a map on a display section, the display section uses display-oriented data having element data relating to elements that constitutes the map. In other words, the map is smoothly displayed with the use of data dedicated to display functions. In a navigation system, when overlaying a current position of a vehicle onto a displayed map, map matching processing is performed in order to display the current position in a manner such that the vehicle travels on a road in the map. It is known that the map matching processing is also performed, with the use of matching data where a road is represented by point information and segment information that connects the point information, in order to appropriately correct the current position on the basis of the matching data and the current position of the vehicle separately measured and overlay the corrected current position onto the map displayed by the display-oriented data.

By the way, when traveling according to a travel route, the travel route acquired from the server unit often needs to be changed because of constructions, traffic accidents or traffic jams. With an arrangement where the server unit re-searches for a travel route each time the travel route is changed, since it takes time to acquire the re-searched route, prompt and smooth navigation might not be provided. There is a well-know arrangement to overcome this disadvantage in which a server unit distributes an optimum travel route as well as other travel routes in advance considering every points that might cause route changes to eliminate the needs for rerouting at the server unit upon each route change. (See Patent Document 1).

The server unit according to the Patent Document 1 acquires information on a current position and a destination from a terminal unit and searches for the optimum travel route. Then, the server unit recognizes intersections on which route changes might be occurred and searches for travel routes from the intersections to the destination. The server unit sends to a terminal unit the optimum travel route and other travel routes which can be used when the vehicle deviates from the optimum travel route. The terminal unit travels according to the optimum travel route. When the terminal unit deviates form the travel route, the navigation is continued on the basis of the other routes acquired in advance.

[Patent Document 1]

Japanese Translation of a PCT Application 2001-519029 (Pages 6 to 28)

However, the server unit according to the Patent Document 1 distributes the optimum travel route and the plurality of travel routes, which may not be in actual use, to be used when the terminal unit deviates from the travel route. Thus, a communication load as well as communication time are increased while the terminal unit is required to have an ability to receive and process enormous volume of information. These facts result in disadvantages such as limitation of available types of the terminal unit.

SUMMARY OF THE INVENTION

In view of the above-described disadvantage, an object of the present invention is to provide a navigation system enabling preferable navigation, a method thereof, a program thereof and a recording medium storing the program.

A navigation system according to the present invention includes: a terminal unit; and a server unit that stores map information, the server unit searching for a travel route for the terminal unit and sending the searched travel route to the terminal unit over a network so that the terminal unit acquires the sent travel route to navigate a movable body on the basis of the travel route, in which the map information includes matching data that has a plurality of matching mesh information divided into a predetermined area, the matching mesh information containing a plurality of point information each of which has coordinates information and unique point information and represents a predetermined point, and segment information which has unique segment information and connects a pair of the point information, the point information and the segment information representing a road; the server unit that includes a storage section for storing the map information, an information acquisition section for acquiring current position information on a current position of the movable body and destination information on a destination of the movable body, a search section for searching for a travel route for the movable body by using the matching data on the basis of the current position information and the destination information, and a distribution section for distributing information on the searched travel route along with the matching mesh information containing the point information and the segment information to the terminal unit, the matching mesh information representing a road corresponding to the searched travel route; and the terminal unit includes a current position information generator for generating the current position information, a destination information generator for generating the destination information, a receiving section for acquiring the matching mesh information and the information on the searched travel route, a navigation section for navigating the movable body on the basis of the current position information, the acquired matching mesh information and the acquired information on the travel route, and a search-restart section for re-searching for a travel route to the destination by using the matching mesh information when the current position is off the travel route.

A navigation method according to the present invention includes: a terminal unit; and a server unit that stores map information, the server unit having a computing section that searches for a travel route for the terminal unit and sends the searched travel route to the terminal unit over a network so that the terminal unit acquires the sent travel route to navigate a movable body on the basis of the travel route, in which the map information includes matching data that has a plurality of matching mesh information divided into a predetermined area, the matching mesh information containing a plurality of point information each of which has coordinates information and unique point information and represents a predetermined point, and segment information which has unique segment information and connects a pair of the point information, the point information and the segment information representing a road; the navigation method including the steps of: (a) generating current position information on a current position of the movable body and destination information on a destination of the movable body at the terminal unit to acquire the current position information and the destination information over the network; (b) searching for the travel route for the movable body on the basis of the acquired current position information and the destination information at the terminal unit by using the matching data; (c) acquiring the searched travel route and the matching mesh information that includes the point information and the segment information representing a road that corresponds to the travel route at the terminal unit; and (d) navigating the movable body while re-searching a travel route to the destination by the terminal unit on the basis of the current position information, the acquired matching mesh information and information on the acquired travel route with the use of the matching mesh information when the current position is off the travel route.

A navigation program according to the present invention executes the above-described navigation method by a computing section.

A recording medium according to the present invention stores the above-described navigation program in a manner readable by a computing section.

BRIEF DESCRIPTION OF THE DRAWINGS

FIG. 6 is an illustration showing table structure of linked-line block information according to the embodiment;

FIG. 8 is an illustration showing table structure of point information according to the embodiment; and FIG. 9 is a flowchart showing how the navigation system operates to search for a travel route according to the embodiment.

DETAILED DESCRIPTION OF PREFERRED EMBODIMENT(S)

Figure 1:
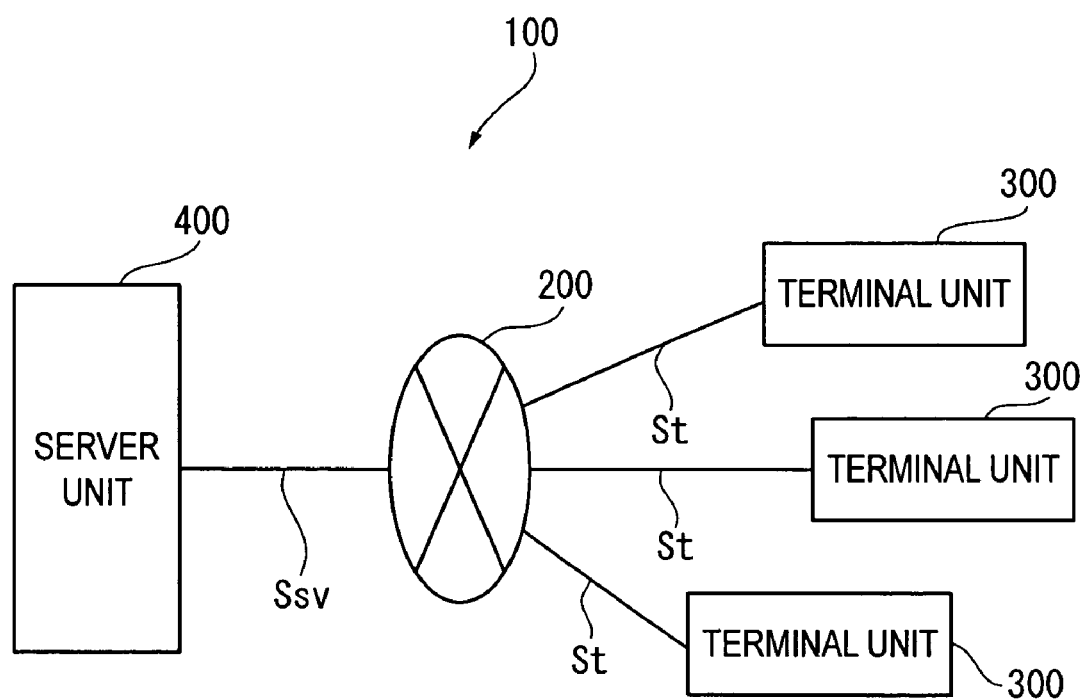
FIG. 1 is a schematic block diagram showing a navigation system according to one embodiment of the present invention.
Figure 2:
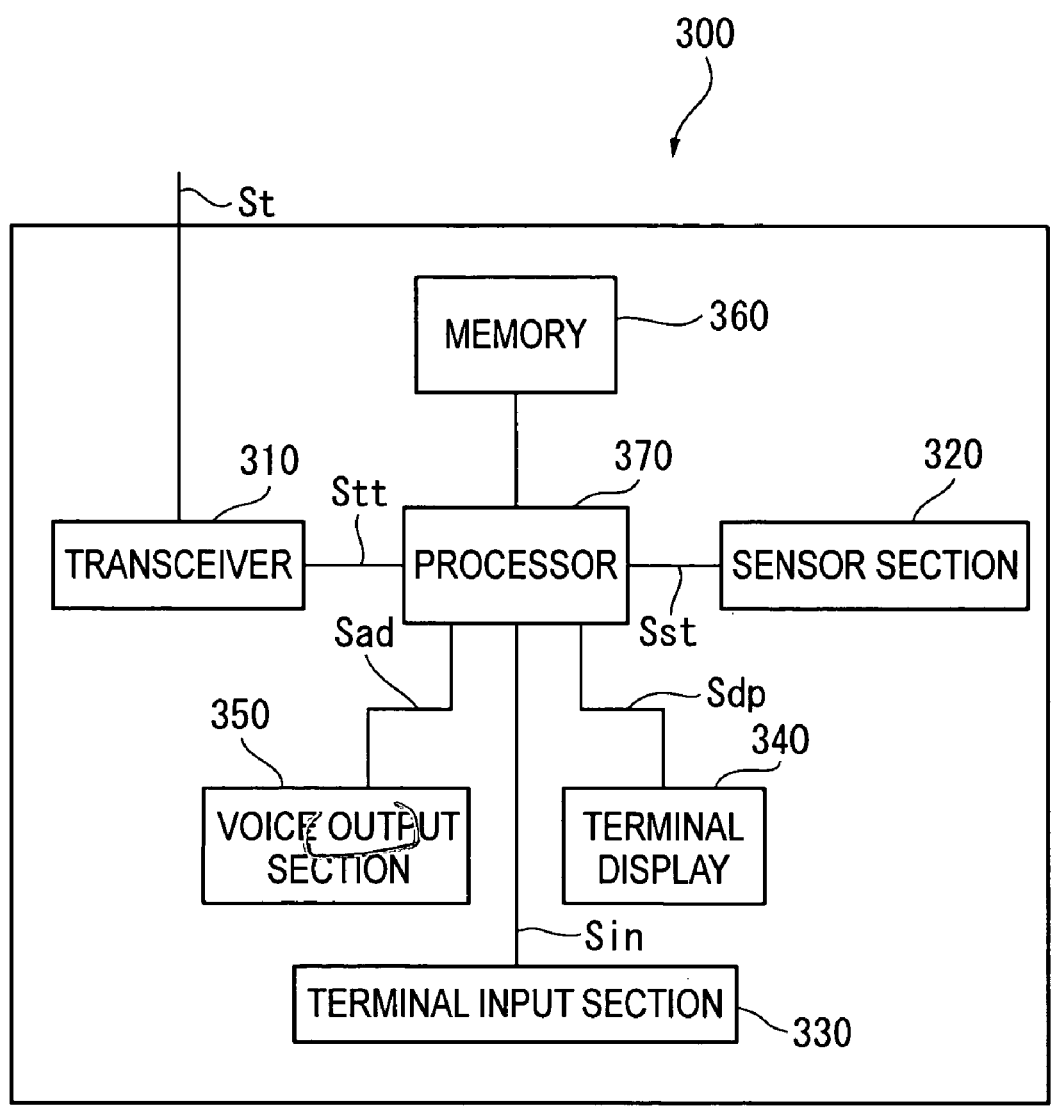
FIG. 2 is a schematic block diagram showing a terminal unit according to the embodiment.
Figure 3:
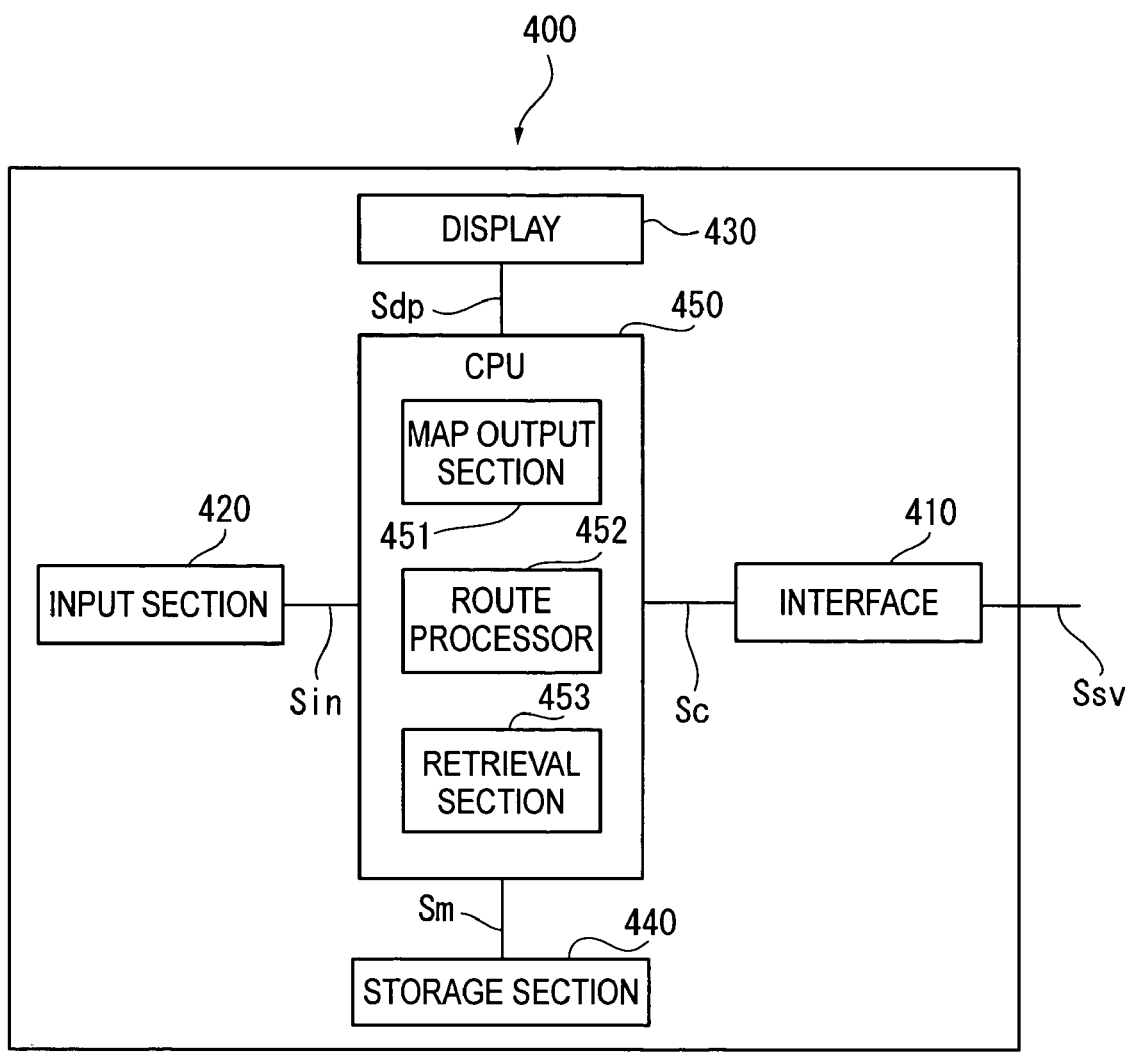
FIG. 3 is a schematic block diagram showing a server unit according to the embodiment.
Figure 4:
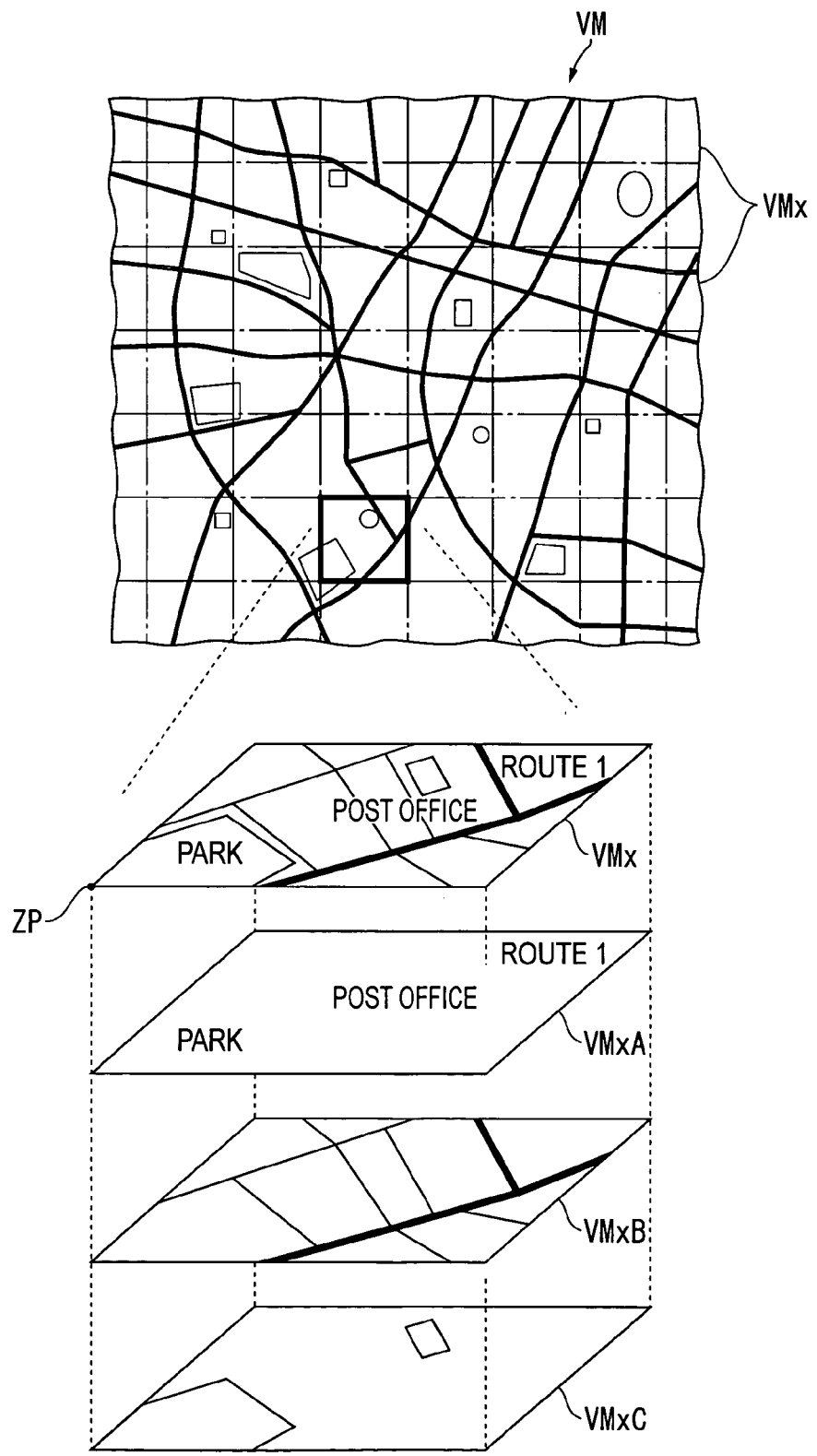
FIG. 4 is a conceptual diagram schematically showing table structure of display-oriented data of map information according to the embodiment.
Figure 5:
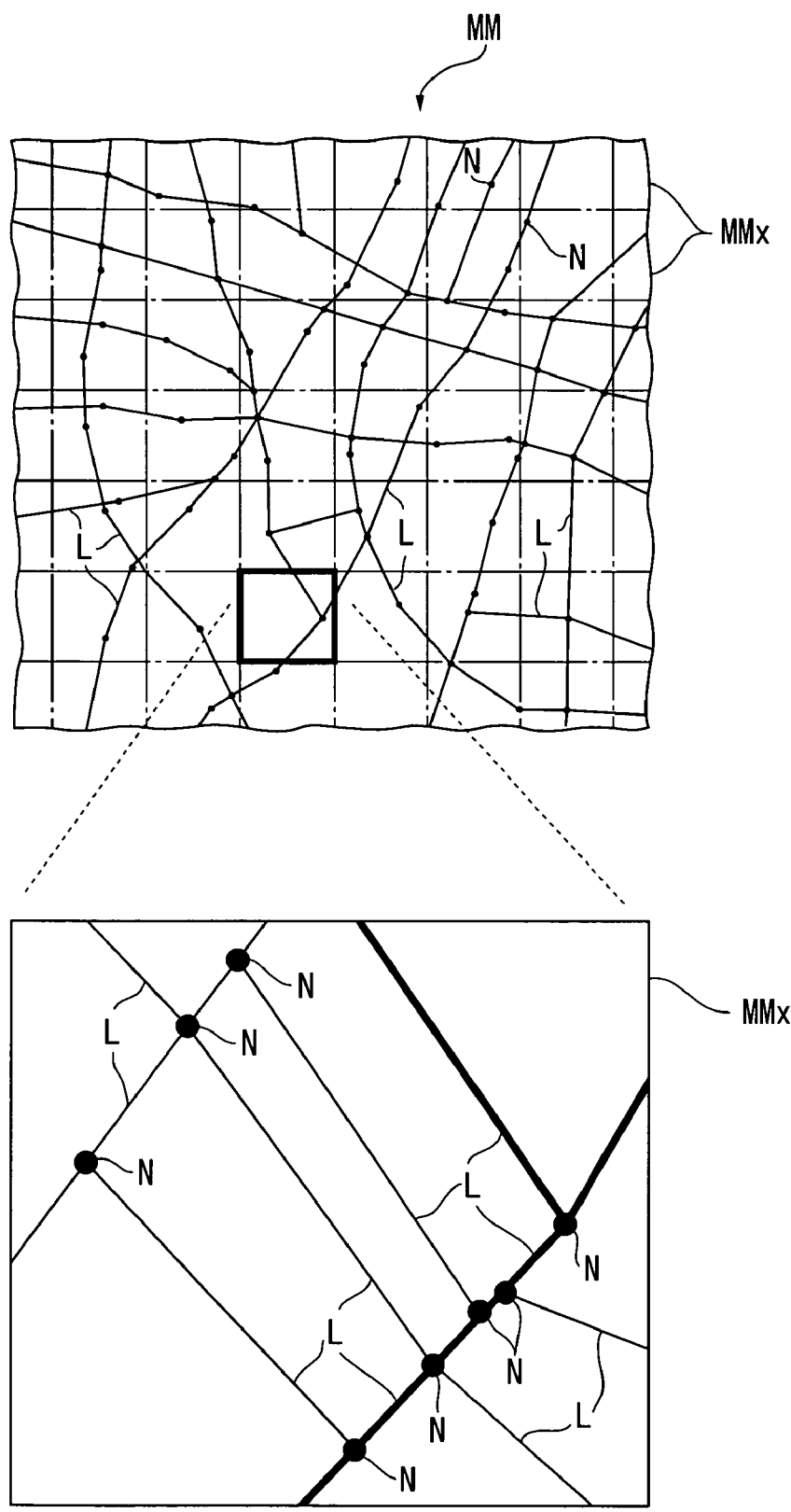
FIG. 5 is a conceptual diagram schematically showing table structure of matching data in the map information according to the embodiment.
Figure 7:
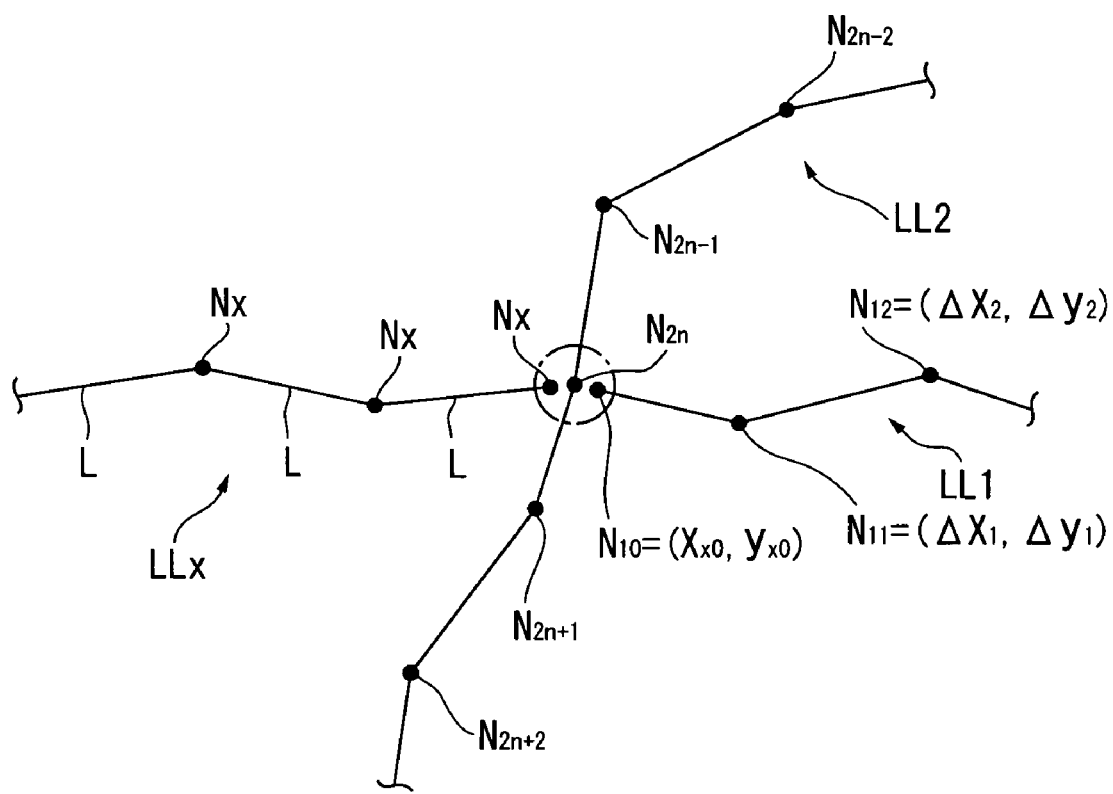
FIG. 7 is an illustration showing relation between nodes and links in the matching data according to the embodiment.

Now, an embodiment of the present invention will be described with reference to attached drawings. In the embodiment below, a communication-based navigation system is designated as an example of a navigation system of the present invention. FIG. 1 is a schematic block diagram that shows the navigation system according to the embodiment. FIG. 2 is a schematic block diagram that shows a terminal unit. FIG. 3 is a schematic block diagram that shows a server unit. FIG. 4 is a conceptual diagram that schematically shows table structure of display-oriented data in map information. FIG. 5 is a conceptual diagram that schematically shows table structure of matching data of the map information. FIG. 6 is an illustration that shows table structure of linked-line block information. FIG. 7 is an illustration that shows relation between nodes and links in the matching data. FIG. 8 is an illustration that shows table structure of point information.

[Configuration of Navigation System]

In FIG. 1, a reference numeral 100 denotes the communication-based navigation system designated as the navigation system. The navigation system 100 provides guidance according to travel progress of a movable body such as a vehicle, an aircraft, and a ship. The navigation system 100 has a network 200, terminal units 300 that function as a navigation apparatus, and a server unit 400.

The terminal units 300 and the server unit 400 are connected to the network 200. The terminal units 300 and the server unit 400 are connected each other over the network 200 in a manner such that information can be transmitted/received between them. The network 200 may be an Internet that is based on general-purpose protocols such as TCP/IP, an intranet, a LAN (Local Area Network), a communication network and a broadcasting network that have a plurality of base stations that can exchange information by way of a radio medium, or a radio medium itself that realizes direct information exchange between the terminal units 300 and the server unit 400. The radio medium that can be used with this embodiment may be any of electric waves, light beams, sound waves and electromagnetic waves.

Each terminal unit 300 may be, for example, an on-board unit that is installed in a vehicle as a movable body, a portable unit, a PDA (Personal Digital Assistant), a mobile phone, a PHS (Personal Handyphone System), or a portable personal computer. The terminal unit 300 acquires below-described map information distributed by the server unit 400 over the network 200. On the basis of the map information, the terminal unit 300 displays information on a current position and a destination, searches for and displays a route to the destination and predetermined shops nearby, or displays information on service contents of the shops. The terminal unit 300, as shown in FIG. 2, has a transceiver 310 as a terminal communication section, i.e. a receiving section, a sensor section 320 as a positioning section, a terminal input section 330 as a terminal operation section, a terminal display 340 as a terminal display section, a voice output section 350, a memory 360 as a terminal storage section, and a processor 370 as a processing section.

The transceiver 310 is connected to the server unit 400 over the network 200, and also connected to the processor 370. The transceiver 310 can receive a terminal signal St from the server unit 400 over the network 200. When acquiring the terminal signal St, the transceiver 310 performs preset input interface processing so as to output it as a processing terminal signal Stt to the processor. The transceiver 310 can also input the processing terminal signal Stt from the processor 370. When acquiring the processing terminal signal Stt to be input, the transceiver 310 performs preset output interface processing so as to send it as a terminal signal St to the server unit 400 over the network 200.

The sensor section 320 detects progress of a vehicle, i.e. a current position and a driving chart so as to output it as a predetermined signal Ssc to the processor 370. The sensor section 320, for instance, has a GPS (Global Positioning System) receiver (not shown) and various sensors (not shown) such as a speed sensor, a direction sensor, and an acceleration sensor. The GPS receiver receives electric navigation waves output from a GPS satellite (not shown), which is an artificial satellite, by way of a GPS antenna (not shown). Then, the GPS receiver computes pseudo-coordinates values of the current position on the basis of a signal corresponding to the received electric navigation waves and outputs it as GPS data to the processor 370.

The speed sensor included in the sensor section 320 is arranged on the vehicle so as to detect driving speed and actual acceleration of the vehicle on the basis of a signal that changes in response to the vehicle speed. The speed sensor reads a pulse signal, voltage values and the like that are output by the revolutions of the axles and wheels of the vehicle. Then, the speed sensor outputs the detected information on the pulse signal and the voltage values to the processor 370. The direction sensor is arranged on the vehicle and provided with a so-called gyro-sensor (not shown) so as to detect a direction for the vehicle, i.e., a driving direction for the vehicle to proceed. The direction sensor outputs a signal representing the detected information on the driving direction to the processor 370. The acceleration sensor is arranged on the vehicle so as to detect the acceleration of the vehicle in the driving direction thereof. The acceleration sensor converts the detected acceleration into sensor output values that represents detected information such as pulse and voltage, then output them to the processor 370.

The terminal input section 330, which may be a keyboard, a mouse or the like, has various operation buttons (not shown) for input operations. The input operations with the use of the operation buttons include configurations for setting operational preferences for the terminal unit 300 and the like. More specifically, the operation buttons may be used to issue an instruction for carrying out a communication operation, i.e., communication request information as acquisition request information for acquiring information over the network 200, to set information contents to be acquired and acquisition criteria, to set a destination, to retrieve information and to display a driving chart, or progress of the vehicle. When the configurations are input, the terminal input section 330 outputs a predetermined signal Sin to the processor 370 so as to set the configurations. Note that in the terminal input section 330, without limiting to the operation buttons, a touch panel provided at the terminal display 340 or voice may be employed for input operations to specify various configurations.

The terminal display 340 is controlled by the processor 370 to display a signal Sdp representing image data sent from the processor 370. The image data may be those representing below-described map information and retrieval information sent form the server unit 400, TV image data received by a TV receiver (not shown), image data stored in an external device such as a recording medium, which may be an optical disk or a magnetic disk and read by a drive, and image data in the memory 360. The terminal display 340, to be specific, employs a liquid crystal panel, an organic EL (electroluminescence) panel, a PDP (Plasma Display Panel) or a CRT (Cathode-ray Tube).

The voice output section 350 has a voicing section such as a speaker (not shown). The voice output section 350 is controlled by the processor 370 to output various signals Sad, which may be voice data sent from the processor 370, in audio form by using the voicing section. Information output in audio form, which includes, for example, driving direction and driving chart of a vehicle, is provided to a vehicle driver for navigating the vehicle. The voicing section can output, for example, TV audio data received by a TV receiver and audio data recorded on an optical disk or a magnetic disk as needed. Without limiting to the self-contained voicing section, the voice output section 350 may utilize a voicing section equipped with the vehicle instead.

The memory 360 stores the various information acquired over the network 200, the configurations input by the terminal input section 330, music data, image data and the like as needed. The memory 360 also stores various programs that run on an OS (Operating System) for controlling the whole operation of the terminal unit 300. Note that the memory 360 may have a drive or a driver for storing data in HD (Hard Disk) or optical disks in a readable form.

The processor 370 has various input/output ports (not shown) including, for example, a communication port connected to the transceiver 310, a GPS receiving port connected to the GPS receiver, sensor ports connected respectively to various sensors, a key input port connected to the terminal input section 330, a display control port connected to the terminal display 340, a voice control port connected to the voice output section 350 and a memory port connected to the memory 360. The processor 370 has various programs (not shown) including a current position recognizer as a current position information generator, a destination recognizer as a destination information generator, an information retriever, a guidance providing section as a navigation section, a display controller, a map matching section as a correction section, a coordinates matching section, a search-restart section and the like. The processor 370 further includes an internal clock that enables to acquire time information on the current date and time.

The current position recognizer recognizes the current position of the vehicle. More specifically, it calculates a plurality of current pseudo-positions of the vehicle on the basis of the speed data and the direction data output respectively from the speed sensor and the direction sensor in the sensor section 320. The current position recognizer further recognizes the current pseudo-coordinates values of the vehicle on the basis of the GPS data on the current position output from the GPS receiver. Then, the current position recognizer compares the calculated current pseudo-positions with the recognized current pseudo-coordinates values, calculates the current position of the vehicle on map information independently acquired, and recognizes the current position.

The current position recognizer determines slope angle and altitude of a drive road on the basis of the acceleration data output from the acceleration sensor and calculates the current pseudo-position of the vehicle so as to recognize the current position. In other words, it can accurately recognize the current position of the vehicle even if the vehicle is on an intersection with an overpass or on an elevated highway where roads are mutually overlapping in a two-dimensional view. Furthermore, when the vehicle is running on a mountain road or a slope, the recognizer corrects the difference between the travel distance obtained only on the basis of the speed and direction data and the actual driving distance by using the detected slope angle of the road to accurately recognize the current position.

The current position recognizer can recognize not only the current position of the vehicle as described above but also a starting point, or an initial point specified by means of the terminal input section 330 as a current pseudo-position. Various information acquired by the current position recognizer is stored in the memory 360 as needed.

The destination recognizer, for instance, acquires destination information on the destination specified by means of input operations with the terminal input section 330 and recognizes the position of the destination. The specified destination information includes, for example, coordinates such as latitude and longitude, address, telephone number and various information that identifies a location. Such destination information recognized by the destination recognizer is stored in the memory 360 as needed.

The information retriever acquires, on the basis of the retrieval information that is included in the information acquired by the transceiver 310, various information stored in the memory 360 and associated with the retrieval information. Specifically, for example, item information to be retrieved is shown on the terminal display 340 by using a list screen, number key screen for inputting numeric value like numbers, and a character input screen for inputting characters such as Japanese alphabet and English alphabet. Then the memory 360 adequately acquires hierarchically arranged item information on the basis of the input operations at the terminal input section 330. In this way, the information is retrieved.

The guidance providing section provides guidance in visual form by using the terminal display 340 or in audio form by using the voice output section 350. The guidance is related to the travel of the vehicle, and may include contents for assisting the drive of the vehicle on the basis of travel route information acquired in advance according to the driving chart and stored in the memory 360. The guidance providing section, for instance, displays a predetermined arrows and symbols on the screen of the terminal display 340. It also provides messages such as "At the intersection of XX in 700 m ahead, turn right toward YY.", "You have deviated from the travel route.", and "There is a traffic jam in the route ahead" in audio form by using the voice output section 460.

The display controller controls the terminal display 340 as needed and instructs the terminal display 340 to display various information. Under the control of the display controller, the terminal display 340 can also display various screens for retrieving information with the information retriever.

The map matching section performs map matching processing for adequately displaying the current position recognized by the current position recognizer on the basis of the below-described map information acquired by the server unit 400. In the map matching processing, the current position information is adequately corrected or amended to avoid locating the current position overlaid onto the map displayed on the terminal display 340 off the road, which is an element constituting the map displayed on the terminal display 340, and the corrected information is displayed. In the map matching processing, the below-described map matching data is utilized as the map information.

The coordinates matching section performs coordinates matching processing for determining whether two or more sets of point information, i.e., information on a node N in the below-described matching data MM in the map information acquired from the server unit 400 indicate an identical point or not. Namely, the coordinates matching section acquires the point information on a node N in the matching data MM and reads coordinates information that constitutes the point information. Specifically, the coordinates matching section calculates coordinates values such as latitude and longitude on the basis of the coordinates values on the coordinates information and an offset amount. If a plurality of nodes N have identical coordinates values (as shown in a chained line in FIG. 7), the coordinates matching section reads flag information that constitutes the point information on the nodes N and determines whether the node flags are "1" or "0". If both of the node flags are "1", the nodes N indicate an identical point, which may be an intersection. Therefore, the coordinates matching section determines that roads are arranged in a manner that links L, each of which is connected to any of the nodes N and constitutes own linked-line block information, are crossing each other. If at least one node flag of the two sets of point information is "0", the nodes N do not indicate an identical point, and represent, for example, an intersection with an overpass. Then, the coordinates matching section determines that roads are arranged in a manner that links L, each of which is connected to respective nodes N and constitutes own linked-line block information, are not crossing each other.

The search-restart section re-searches for a travel route to the destination by using matching mesh information MMx acquired from the server unit 400 when the current position is off the travel route acquired by searching the below-described server unit 400. More specifically, the search-restart section acquires current position information, destination information, and configuration information for setting a route. Then, on the basis of the acquired information, the search-restart section searches for a road, which may be available for traffic, different from the travel route acquired from the server unit 400 and searches for a route with shorter travel time, a route with shorter travel distance, or a route without traffic jams and traffic controls. At this time, the search-restart section uses the matching mesh information MMx in the matching data MM in the map information, which has been acquired from the server unit 400 up on travel route search. Note that in re-searching for a travel route, the search-restart section adequately searches for a route on the basis of the road arrangement determined with the coordinates matching processing performed by the coordinates matching section. The travel route information contains, for example, route guidance information for assisting the drive with navigation during the drive. The route guidance information is appropriately displayed or output in audio form at the terminal unit 300 for assisting the drive. The search-restart section determines that a route can not be searched when, for example, the area covered by the previously acquired matching mesh information MMx is too small to detect a travel route other than the previously acquired travel route, or when a processing ability of hardware is limited due to capacity shortage of the memory 360 of the terminal unit 300 and the like. In such cases, it sends a signal for instructing the server unit 400 to re-search for a travel route.

The server unit 400 can send/receive information to/from the terminal unit 300 over the network 200. In addition, the server unit 400 can retrieve various information over the network 200 from servers (not shown) that are installed in various public offices including the Meteorological Agency and the National Police Agency, private organizations, the Vehicle Information and Communication System (VICS)

and business enterprises. The information acquired by the server unit 400 includes travel information, i.e., various travel related information that is utilized during travel such as weather information, traffic information including traffic jams, traffic accidents, road constructions and traffic controls, and shop information on various shops including gasoline stations and restaurants. As shown in FIG. 3, the server unit 400 has an interface 410 as an information acquisition section, an input section 420, a display 430, a storage section 440, CPU (Central Processing Unit) 450 as a computing section and the like.

The interface 410 performs preset input interface processing on a server signal Ssv input over the network 200 so as to output it as a processing server signal Sc to the CPU 450. When the CPU 450 inputs the processing server signal Sc to be sent to the terminal unit 300 to the interface 410, the interface 410 performs preset output interface processing on the input processing server signal Sc so as to output it as a server signal Ssv to the terminal unit 300 over the network 200. Note that the server signal Ssv can be output only to a predetermined terminal unit 300 on the basis of the information described in the server signal Sc as needed.

The input section 420, which may be a key board, a mouse or the like, has various operation buttons (not shown) for input operation, just like the terminal input section 330. The input operations with the use of the operation buttons are employed to specify configurations, more specifically, to set operational preferences for the server unit 400, to set information to be stored in the storage section 440, and to update information stored in the storage section 440 and the like. When the configurations are input, the input section 420 outputs a signal Sin corresponding to the configurations to the CPU 450 so as to specify the configurations. Note that not limiting to the operation buttons, a touch panel provided at the display 430 or voice may be used for input operations so as to specify the configurations.

The display 430, just like the terminal display 340, is controlled by the CPU 450 to display a signal Sdp representing image data sent from the CPU 450. The image data may be those sent from the storage section 440 and image data acquired from the respective servers.

The storage section 440 stores various information received from the terminal unit 300 or external servers and map information in a readable form. Specifically, the storage section 440 may have a storage medium (not shown) for storing information, a drive or a driver (not shown) as a reading section for storing information in the storage medium in a manner that the information can be read from the storage medium. Information to be stored may include, for example, information input by means of the input operations at the input section 420. The contents of the information stored with the input operations can be updated as needed. The storage section 440 also stores various programs that run on an OS (Operating System) for controlling the whole operation of the server unite 400 and the navigation system 100 as information.

The map information as information includes display-oriented data VM, i.e., so-called POI (Point Of Interest) data as shown in FIG. 4, matching data MM as shown in FIG. 5, map data for travel route search and the like.

The display-oriented data VM includes, for example, a plurality of display-oriented mesh information VMx each of which has a unique number. To be more specific, the display-oriented data VM is divided into a plurality of display-oriented mesh information VMx each of which relates to an area. The display-oriented data VM is formed with the plurality of display-oriented mesh information VMx continuously arranged in a matrix form. The display-oriented mesh information VMx may be further divided into a plurality of display-oriented mesh information VMx to be located at a lower layer each of which relates to a smaller area as needed. Each display-oriented mesh information VMx has a rectangular shape with each side thereof having a predetermined length, i.e., a length reduced from the actual geographic length according to the scale of the map. At a predetermined corner thereof, absolute coordinates ZP relative to whole map information, e.g., global map is contained.

The display-oriented mesh information VMx is, for instance, constituted by name information VMxA such as intersection names, road information VMxB, background information VMxC. The name information VMxA is constituted by table structure for data that positions and displays miscellaneous data in the area, e.g., intersection names and regional names, at a predetermined position according to the spatial relationship with the absolute coordinates ZP. The road information VMxB is constituted by table structure for data that positions and displays roads i.e., road element data in the area at predetermined positions according to the spatial relationship with the absolute coordinates ZP. The background information VMxC is constituted by table structure for data that positions and displays symbols representing famous places or buildings as miscellaneous data, image information as miscellaneous data representing the famous places or buildings at predetermined positions according to the spatial relationship with the absolute coordinates ZP.

The matching data MM, just like the display-oriented data VM, is divided into a plurality of matching mesh information MMx each of which has a unique number and relates to an area. The matching data MM is formed with the plurality of matching mesh information MMx continuously arranged in a matrix form. The matching mesh information MMx may be further divided into a plurality of matching mesh information MMx to be located at a lower layer each of which relates to a smaller area as needed. Each matching mesh information MMx has a rectangular shape with each side thereof having a predetermined length, i.e., a length reduced from the actual geographic length according to the scale of the map. At a predetermined corner thereof, absolute coordinates ZP relative to whole map information, e.g., global map is contained. Note that the matching mesh information MMx may have data structure that represents an area different from the area represented by the display-oriented mesh information VMx, that is, it may use a scale for area division different from that used by the display-oriented mesh information VMx. If a same scale is used, unique number information may be used for associating the data. If a different scale is used, absolute coordinates may be used for associating data.

The matching data MM is used for the map matching processing for correcting the position of the vehicle on the screen to be located on a road so as to avoid displaying errors such that the vehicle is displayed on a building instead of a road, when the progress of travel of the vehicle is overlaid onto the map information on the screen. The matching data MM has a plurality of linked-line block information.

As shown in FIG. 6, the linked-line block information is constituted by table structure for data in which a plurality of links L, that are segment information connecting nodes N (shown as dots in FIG. 5) as point information constituting roads and representing points, are mutually associated according to a predetermined rule. For instance, as shown in FIGS. 5 and 7, a predetermined length is associated with one another by linked-lines LL, e.g., KOSHU street and OME street, that are sequential lines constituted by sequentially connected links L. Each link L has its own number i.e., unique segment information assigned to it (hereafter referred to as link ID) and node information that may be own number indicating the two nodes N connected by a link L.

Each node N may represent a knotting point such as an intersection of roads, a bending point, a branching point or a joining point. Information on node N has unique point information that is a unique number assigned to each node N in the linked-line block information, coordinates information representing the position where each node N is located, and flag information that is branching information telling if the node N represents an intersection or a branching point where a plurality of links cross or not. There may be nodes N that only have unique point information without flag information and coordinates information for simply representing shape of a road. Nodes N may additionally have attribute information that represents road structure such as width of a tunnel and a road. The nodes N without flag information for simply representing road shapes are not used by the below-described coordinates matching section for recognizing point information identification.

As shown in FIG. 7, in the case of node Nx0 corresponding to a starting point of the link L of a road that constitutes linked-line block information, the coordinates information is information on coordinates relative to the absolute coordinates ZP. As shown in FIGS. 7 and 8, in the case of the node Nx1 connected to the node Nx0 for the starting point with a link L, the node Nx2 connected to the node Nx1 with a link L, and the following node Nxn, the coordinates information is information on an offset amount from the node Nx0 for the starting point or from a connected node Nxn. A node N to be a standard for offset amount measurements is specified in accordance with record order of the table structure, that is, an offset amount form a preceding node N constitutes coordinates information.

The flag information represents whether points represented by nodes are identical or not and represents road arrangements on the basis of relation with other nodes. To be more specific, the flag information, as shown in FIG. 8, is represented by a node flag "0" or "1". "1" means that a node N for another road, or a node N in another linked-line block information, indicates an identical position which may be an intersection. "0" means that the position is identical in two-dimensional view but not identical in reality and may be an intersection with an overpass.

Further, the linked-line block information in the matching data MM is associated with information on road structure that describes, for example, number of lanes, whether it is main line or not, whether it is national road or state road, road types such as tall road, tunnel structure and the like. Based on the information on such road structure, a road can be displayed on a map corresponding to the display-oriented data VM.

Map information for travel route search, similar to the matching data, has table structure including point information for representing points such as nodes N for representing a road and segment information for connecting points such as links L. The information is structured to represent a road for searching for a travel route.

The storage section 440 stores retrieval information for acquiring information on a predetermined point on the map information. The retrieval information is information for responding to search requests from the terminal unit 300. It includes various information such as contents describing names of prefectures, cities, areas, and locations, which are areas to be sequentially segmentalized on map information, and guidance as well as various information on shops as points. The table structure thereof applies tree structure in which item information is hierarchically associated each other.

The storage section 440 further stores personal information that is information on users for the navigation system 100 with the use of terminal units 300. The personal information includes name, address, ID number assigned to each user, password, type of the terminal unit 300 for the use of the navigation system 100, address number for sending/receiving information to/from the terminal unit 300. Furthermore, the storage section 440 stores various information that is used for executing navigation processing in a manner readable by the CPU 450 as needed.

The CPU 450, with the use of various programs stored in the storage section 440, includes a map output section 451 as a distributing controller, a coordinates matching section (not shown), a route processor 452 as a search section, a retrieval section 453 and the like.

When a processing server signal Sc is input, according to the information described in the processing server signal Sc for requesting a distribution of information on map information, the map output section 451 searches for the requested information, such as display-oriented data VM and matching data MM corresponding to a predetermined area, from the map information stored in the storage section 440 and reads it as a memory signal Sm. The map output section 451 converts the read memory signal Sm into processing a server signal Sc as needed, outputs it on the basis of the processing server signal Sc to predetermined or all terminal units 300 via the interface 410 and the network 200, and distributes the requested information in the map information.

The coordinates matching section, just like the above-described coordinates matching section of the terminal unit 300, performs coordinates matching processing for determining whether two or more sets of point information, i.e., information on a node N in the matching data MM in the map information indicate an identical point or not.

When the processing server signal Sc is input, according to the information described in the processing server signal Sc for requesting a route search, the route processor 452 computes and searches for a travel route using map information stored in the storage section 440 and generates a memory signal Sm. The route processor 452 converts the generated memory signal Sm into a processing server signal Sc as needed, outputs it on the basis of the processing server signal Sc to a predetermined terminal unit 300 via the interface 410 and the network 200, and provides the travel route.

More specifically, the route processor 452 acquires current position information, destination information, and configuration information for setting a route from the terminal unit 300. Then, on the basis of the acquired information, the route processor 452 searches for a road, which may be available for traffic, by using the map information for travel route search, sets a route with shorter travel time, a route with shorter travel distance, or a route without traffic jams and traffic controls, and generates travel route information as a memory signal Sm. Note that in searching for a travel route, the route processor 452 might use the matching data MM in the map information other than the map information for travel route search. This applies to, for instance, the case where the route processor 452 searches for a travel route including back roads and narrow roads which are not contained in the map information for travel route search. When the matching data MM is used, the route is searched according to the road arrangements determined by the coordinates matching section at the CPU 450 as needed. The travel route information contains, for example, route guidance information for assisting the drive with navigation during the drive. The route guidance information is adequately displayed or output in audio form at the terminal unit 300 for assisting the drive.

When the processing server signal Sc is input, according to the information described in the processing server signal Sc for requesting a retrieval of retrieval information, the retrieval section 453 hierarchically retrieves the retrieval information stored in the storage section 440 on the basis of the item information and reads it as a memory signal Sm. The retrieval section 453 converts the read memory signal Sm into a processing server signal Sc as needed, outputs ith on the basis of the processing server signal Sc to predetermined terminal units 300 via the interface 410 and the network 200, and distributes the retrieval information.

According to the signal Sin that is input from the input section 420 by means of the input operations at the input section 420, the CPU 450 computes with the contents corresponding to the input operations, and generates a signal Sdp as needed. Then the CPU 450 outputs the generated various signals to the display 430, the interface 410 and the storage section 440 as needed and operates them so as to execute the input contents.

[Operation of Navigation System]

The operations of the navigation system 100 will be described below in reference to the drawings. FIG. 9 is a flowchart that shows how the navigation system operates to search for a travel route.

Firstly, a user on board turns ON the terminal unit 300 to supply electric power. As the electric power is supplied, the processor 370 controls the terminal display 340 so as to display a main menu and prompt the user to specify content to be operated by the terminal unit 300.

As shown in FIG. 9, the user may specify processing, for example, for searching for a travel route with input operations at the terminal input section 330. When the processor 370 recognizes that terminal processing for searching for the travel route is specified (Step S1), the processor 370 instructs the terminal display 340 to display a screen for prompting the user to specify various information necessary for the travel route search such as configuration information including a destination, a priority on the shortest distance or the shortest time. The processor 370 recognizes the various information necessary for the travel route search, sends a signal for requesting a travel route search along with the various information over the network 200, and instructs the route processor 452 of the server unit 300 to search for a travel route.

In other words, the processor 370 recognizes the current position by using the current position recognizer (Step S2) and also recognizes the specified destination by using the destination recognizer (Step S3). Specifically, the current position recognizer calculates the current position of the vehicle on the basis of speed data and direction data respectively output from the speed sensor and the direction sensor in the sensor section 320 and GPS data on the current position output from the GPS receiver, and acquires the current position information. The acquired current position information is stored in the memory 360 as needed.

The processor 370 controls the terminal display 340 to display a screen for prompting the user to specify a destination with the input operations at the terminal input section 330. When the user specifies a destination with the input operations at the terminal input section 330 according to the displayed instruction on the screen, the destination recognizer acquires destination information on the specified destination. The acquired destination information is stored in the memory 360 as needed.

Upon the destination input operations at the terminal unit 330, when requesting information on a point as a destination point, the user performs the input operations for requesting retrieval information on the point according to instructions on the screen displayed on the terminal display 340. According to the retrieval request for retrieval information on the point, the processor 370 controls the transceiver 310 to send a signal that requests the retrieval of the retrieval information at the server unit 400 to the server unit 400. Upon the receipt of the signal, the server unit 400 operates the retrieval section 453 as needed, instructs mesh information in lower layers of each area to hierarchically search for the retrieval information on the destination by using, for instance, the map information MP, and acquires the retrieval information associated with the destination point from the storage section 440. Then the server unit 400 sends the acquired retrieval information on the destination to the terminal unit 300 via the interface 410 and the network 200. When the terminal unit 300 acquires the acquired retrieval information on the destination, the processor 370 controls the terminal display 340 to display the retrieval information as needed.

If the retrieval information includes instructions for displaying a predetermined area of the map information including the destination, or if a user who recognized the retrieval information specifies to display a predetermined area with the input operations at the terminal unit 330, the server unit 400 sends the retrieval information as well as display-oriented mesh information VMx corresponding to the area, and instructs the terminal display 340 to display at the terminal unit 300 as needed. In this way, the terminal unit 300 acquires and displays the desired map information. Thereafter, the user sets the destination with the input operations at the terminal input section 330 by, for example, moving a cursor on the map displayed on the screen so as to designate the point information on the destination. When the point information on the destination is designated, the destination recognizer at the processor 370 recognizes the point information on the destination as destination information and instructs the memory 360 to store it.

The processor 370 controls the terminal display 340 to display a screen for prompting the user to input configurations, i.e., criteria for the travel route search. When the user specifies the configurations with the input operations at the terminal input section 330 according to displayed instructions on the screen, the processor 370 acquires the configuration information on the specified configurations (Step S4). The acquired configuration information is stored in the memory 360 as needed.

Then, the processor 370 controls the transceiver 310 to send a signal for requesting a travel route search as well as the current position information, the destination information and the configuration information stored in the memory 360 to the server unit 400 (Step S5). When the server unit 400 acquires the current position information, the destination information, the configuration information and the signal for requesting a travel route search (Step S6), the route processor 452 performs route search processing for searching for a travel route from the current position of the vehicle to the destination by using the map information for travel route search and the matching data MM in the map information stored in the storage section 440. Specifically, when searching for a major street whose data is accumulated and maintained in the map information for the travel route search, the route search processing is performed by using the map information for the travel route search. On the other hand, when searching for a minor street whose data is not accumulated in the map information for the travel search, the route from a minor street to a major street is searched by using the matching data MM. As for the route search processing with the use of the matching data MM, the processing is carried out after the coordinates matching section determines whether a plurality of nodes N indicate an identical point or not to recognize road arrangements based on relations between links L. The route processor 452 detects a plurality of travel routes, selects some of them according to the acquired configuration information, and generates travel route information on some travel routes that satisfy the criteria specified by the user (Step S7).

According to the information such as an ID (Identification) Number for identifying the terminal unit 300 that is sent along with the configuration information, the server unit 400 controls the interface 410 to send the travel route information acquired as the result of the route search and the map information to the predetermined terminal unit 300 (Step S8). Note that the matching data MM may be acquired in advance according to the current position information. The map information to be sent in the above step is sufficient to have only the matching mesh information MMx in the matching data MM containing nodes N and links L representing a road that corresponds to the travel route, the display-oriented mesh information VMx in the display-oriented data VM representing areas excluding those represented by the matching mesh information MMx, the name information VMxA and the background information VMxC in the areas that correspond to the matching mesh information MMx.

When the processor 370 of the terminal unit 300 acquires the travel route information (Step S9), it performs coordinates matching processing on the acquired matching data MM (Step S10), recognizes the road arrangements or the road connections so that the memory 360 stores the information as needed. Thereafter, the processor 370 controls the terminal display 340 to display the travel route overlaid onto the acquired map information.

Subsequently, the processor 370 recognizes the progress of the travel based on the data output from the speed sensor, the direction sensor and the acceleration sensor at the sensor section 320 and the GPS data output from the GPS receiver. Then, the processor 370 instructs the guidance providing section to provide guidance information on the travel of the vehicle in audio form or in visual form based on the recognized travel progress and the route guidance information contained in the travel route information acquired from the server unit 400 so as to navigate the vehicle (Step S11).

To be more specific, the display controller at the processor 370 connects nodes N, which are contained in the matching mesh information MMx acquired from the server unit 400, with polylines. Then the processor 370 processes the polylines based on the road arrangements described in the linked-line block information constituting the matching data MM and instructs the terminal display 340 to display the roads in the areas corresponding to the matching mesh information MMx in which the travel route is contained. The display controller overlays the name information VMxA and the background information VMxC, that are element data on elements constituting a map except for a road in the areas corresponding to the matching mesh information MMx in the display-oriented mesh information VMx acquired from the server unit 400. The display controller further overlays the current position onto the displayed map.

At the time of the overlay of the current position, the map matching processing is performed on the basis of the matching data MM in order to avoid locating an indicator representing the current position information of the vehicle off the displayed road. Namely, the processor 370 corrects the current position information so that the current position on the screen is located on the matching data MM for the travel route. Thus the current position is displayed on the linked-line that is a sequence of links L. In this way, the current position is overlaid onto the map to provide the navigation. When the current position reaches a predetermined position, guidance on travel direction and the like are provided in audio form or in visual form as described above. Note that the coordinates matching processing is performed upon the acquisition of the matching data MM in Step S10, it may be performed along with the map matching processing or before the map matching processing.

If the user specifies to display areas other than the above-described areas with the input operations at the terminal input section 330, a map is displayed based on the display-oriented mesh information VMx acquired from the server unit 400 in the same manner as the route search.

During the travel, the guidance providing section acquires traffic information including traffic jams, traffic accidents, road constructions and traffic controls, weather information and the like. In other words, the processor 370 of the terminal unit 300 acquires traffic information and weather information from the server unit 400 over the network 200 as needed. Then, when the acquired traffic information and the weather information imply that there may be situations where the travel is affected or a route change is required, the guidance providing section provides guidance considering such situations.

When the route or the destination is changed during the travel, the processor 370 recognizes that the current position is off the travel route. Then the search-restart section re-searches for a travel route from the current position to the destination other than the travel route acquired from the server unit 400, that is, performs rerouting. In the rerouting, the search-restart section searches the matching mesh information MMx that is acquired in advance from the server unit 400 to acquire a travel route. Then the navigation is continued based on the acquired travel route.

The terminal unit 300 determines that a route can not be searched when, for example, the matching mesh information MMx acquired in advance does not serve for the rerouting. In such case, the search-restart section sends a signal from the transceiver 310 to the server unit 400 over the network 200 for instructing the rerouting so that the route processor 452 of the server unit 400 performs rerouting. Then as in the case of the route search, information on the travel route detected by the rerouting and the matching information MMx containing the travel route are sent to the terminal unit 300 for enabling navigation by the terminal unit 300. There is no need to send the display-oriented data VM since the display-oriented data VM has been already sent.

As described earlier, in the above embodiment, the route processor 452 of the sever unit 400 searches for the travel route of the vehicle by using the matching data MM in the map information, on the basis of the current position information and the destination information acquired from the terminal unit 300 over the network 200. The information on the travel route and the matching mesh information MMx containing nodes N and links L representing a road including the travel route are sent to the terminal unit 300 and the terminal unit 300 acquires them. At the terminal unit 300, the guidance providing section provides the navigation based on the current position information and the matching mesh information MMx and the information on the travel route acquired from the server unit 400. When the vehicle deviates from the travel route, a travel route to the destination is re-searched by using the matching mesh information MMx acquired in advance.

With this arrangement, since the server unit 400 needs not to perform rerouting nor to send/receive a signal for the rerouting each time the vehicle deviates from the travel route during the navigation, the terminal unit 300 can independently perform rerouting. Thus, the navigation based on a new travel route provided by the rerouting is promptly and smoothly acquired and that results in preferable navigation.

Upon the map information transmission, only the travel route and the matching mesh information MMx containing the nodes N and the links L representing the a road corresponding to the travel route is sent instead of sending whole matching data MM. This contributes to reduction of communication load and preferable navigation processing. Moreover, as the terminal unit 300 is not required to have high processing ability and mobile phones can serve sufficiently as the terminal unit 300, the field of use thereof can be readily expanded. Also, size and weight of the terminal unit 300 can be easily reduced, so that the installation to a movable body with difficulty of finding installation space can be facilitated.

If the matching mesh information MMx acquired from the server unit 400 can not serve for the re-searching, the re-searching is performed at the server unit 400. Accordingly, navigation is ensured even when the vehicle is long away from the travel route.

The server unit 400 searches for the travel route by using the matching data MM in which a road is represented by nodes N representing a point and links L connecting a pair of nodes N based on the acquired current position information on the current position of the vehicle and the destination information on the travel destination of the vehicle. Then the server unit 400 distributes the matching mesh information MMx in the matching data MM, that is divided into a predetermined area and contains the nodes N and the links L representing the road corresponding to the searched travel route, and the display-oriented mesh information VMx in the display-oriented data VM, that is divided into a predetermined area and corresponds to the areas excluding those represented by the matching mesh information MMx along with the information on the travel route to the terminal unit 300 over the network 200.

With this arrangement, since the road is displayed by using the matching data MM, it is sufficient to distribute only the matching data MM corresponding to the travel route that is required to satisfactorily display the travel progress of the vehicle, and the display-oriented data VM representing the areas that are not covered by the matching data MM. Thus the data volume of the matching data MM, which is relatively big, is considerably reduced, so that the data volume of the map information distributed form the server unit 400 for searching for a travel route and providing the travel progress of the vehicle can be also considerably reduced. This contributes to reduction of communication load for sending/receiving the map information between the server unit 400 and the terminal unit 300 and preferable navigation processing. Moreover, as the terminal unit 300 is not required to have high processing ability and mobile phones can serve sufficiently as the terminal unit 300, the field of use thereof can be readily expanded. Also, size and weight of the terminal unit 300 can be easily reduced, so that the installation to a movable body with difficulty of finding installation space can be facilitated.

The miscellaneous data that displays elements constituting the map except for a road in the display-oriented mesh information VMx for the areas corresponding to the matching mesh information MMx is distributed. The distributed miscellaneous data is overlaid onto the road displayed by the matching mesh information MMx as needed, so that a map similar to the map displayed by the display-oriented data VM can be obtained as well as preferable navigation is provided.

The map matching processing is performed to adequately correct the current position information so that the current poison of the terminal unit 300 on the basis of the acquired current position information is located on the road displayed on the basis of the matching data MM in which nodes N and links L represent a road. The road is displayed on the terminal display 340 on the basis of the nodes N and the links L in the matching data MM instead of the display-oriented data VM. The elements constituting the map except for a road in the display-oriented data VM are adequately displayed with the use of elements data on these elements while the corrected current position is overlaid onto the displayed road. Accordingly, there is no need to use the road information VMxB in the display-oriented data VM for displaying road. The map is displayed by using a part of display-oriented data VM such as name information VMxA and the background information VMxC, thereby reducing information amount to be processed and improving processing efficiency.

Furthermore, instead of using the matching data MM only, the map is displayed by using the display-oriented data VM, as the map information acquired results of route search, that is dedicated to display functions and can be promptly and smoothly displayed. This is because it eliminates the need of the map matching processing. Thus, the map information can be effectively utilized.

When displaying the map during the navigation for the vehicle, a road in the areas including the travel route acquired by the route search are displayed on the basis of the matching mesh information MMx in the area corresponding to the matching data MM. On the other hand, peripheral areas are displayed on the basis of the display-oriented mesh information VMx in the display-oriented data VM that can be rapidly and smoothly displayed since the map matching process is not required. Thus, improved navigation as well as smooth and prompt map display can be provided with the minimum map information.

Since the matching data MM contains information on roads structure as the linked-line block information, the matching data MM can display a road distinguishing, for instance, national roads and city roads. Accordingly, the map can be favorably displayed.

When a road is displayed on the basis of the matching data MM, the polylines generated by using nodes N are processed. It is therefore possible to easily realize a configuration in which the map can be displayed without display-oriented data.

In order to indicate that a plurality of nodes N represent an identical point, the nodes N may be associated with a single node N representing the point, the node N being used in the matching mesh information MMx at upper layer for wider area division. Alternatively, data that has table structure indicating a node N is identical with other nodes N may be additionally provided. With the method of associating with the node N at the upper layer for representing identity of nodes N, however, when new roads are established or road arrangements are changed due to constructions and accordingly linked-lines are changed, the relation with the node N at the upper layer is changed so that the association might not be acquired. With the method of adding information of table structure for representing identity, the volume of map information can not be reduced. Therefore, the storage section 440 might require a large storage space, communication load might be increased during the map information transmission, or loads for route search and matching processing for avoiding to locate the vehicle off the displayed road.

As mentioned earlier, in the above-described embodiment, the point information on nodes N in the matching data MM, which is constituted by nodes N and links L in the map information stored in the storage section 440 of the server unit 400, include flag information for indicating relation with other nodes N depending if they indicate an identical point so as to indicate relation of links L and represent road arrangements. With this arrangement, only by adding node flag with small information volume such as "0" and "1" to the point information on nodes N, the identity of nodes N can be represented so that the volume of the map information can be considerably reduced. Accordingly, the storage space as the storage section 440 necessary for storing the map information is reduced and thereby enabling to store other various information. The communication load for sending/receiving the map information between the server unit 400 and the terminal unit 300 can be also reduced. Moreover, loads for route search and map matching processing for avoiding to locate the vehicle off the displayed road can be reduced and preferable navigation can be provided. Moreover, as the terminal unit 300 is not required high processing ability and mobile phones can serve sufficiently as the terminal unit 300, the field of use thereof is expanded. Also, size and weight of the terminal unit 300 can be easily reduced, so that the installation to a movable body with difficulty of finding installation space can be facilitated.

In the flag information for representing the identity of nodes N, "0" indicates that nodes N are not identical and "1" indicate that nodes N are identical. In this way, as the flag information is represented by two-bit information, the amount of map information can be easily reduced. Since the flag information is represented by the minimum amount of information such as "0" and "1" only to tell if nodes N are identical or not, the coordinates matching section can readily determine if they are identical or not. Thus, the map information can be effectively used.

The coordinates matching section uses the flag information in the map information to recognize the road arrangements. This facilitates recognition of the road arrangements represented by the linked-lines while the map information with reduced volume can be efficiently used.

The storage section 440 and the coordinates matching section are arranged in the single server unit 400. Therefore, upon route search with the use of the map information, the map information is smoothly processed, that is, the road arrangements are promptly recognized, thereby realizing more efficient use of the map information. Note that the coordinates matching information is not necessarily executed at the server unit 400.

The terminal unit 300 for navigation is provided with the coordinates matching section. With this arrangement, upon the navigation, the coordinates matching processing can be performed at the time of map matching processing on the matching data MM, thereby enabling smooth processing. Moreover, when the terminal unit 300 re-searches for a travel route by using the matching data MM, the coordinates matching is performed. In this way, a new travel route is searched within the terminal unit 300 and this achieves smooth processing.

The management of the map information is centralized at the server unit 400. With this arrangement, when a part of the map information is changed, it is enough to change the map information stored in the storage section 440 of the server unit 400. The system is so configured that the updated map information is distributed to the terminal units 300 over the network 200. At all of the terminal units 300, there is no need to change the map information stored therein. This contributes efficient use of map information.

The server unit 400 is provided with the router processor 452 for route search processing with the use of the map information. This realizes a prompt and smooth route search processing. Furthermore, as the terminal unit 300 is not required to perform the search processing, the terminal unit 300 is not required to have high processing ability and mobile phones can serve sufficiently as the terminal unit 300.

Since the coordinates matching section is provided as a program used in the server unit 400, efficient use of map information is readily realized and promotion of the usage can be easily achieved. Additionally, the program may be stored in a recording medium so as to be read by a computing section or a computer for easy realization of efficient use of map information as well as for easy handling of the program and promotion of the usage. The computing section may be a single personal computer, a combination of a plurality of computers that are connected over a network, an element such as a CPU3707 microcomputer or a circuit board on which a plurality of electronic parts are mounted.

[Modification of Embodiment]

The present invention is not limited to the above specific embodiment, but includes modifications and improvements as long as the objects of the present invention can be attained.

The movable body is a vehicle in the above description. However, the present invention can be applied to any movable body such as an airplane or a ship. In an arrangement such that the current position of a user carrying the terminal unit 300 is recognized as the current position of the terminal unit 300, the user may be the movable body. Additionally, a mobile phone or a PHS (Personal Handyphone System) may be used as the terminal unit 300 that can be carried by the user, while the base station of the mobile phone or the PHS may be used as the server unit 400. With this arrangement, the mobile phone or the PHS is adapted to acquire information from the base station.

The acquisition of information in the navigation system 100 adapted to provide guidance according to the progress of the travel is described above, the present invention is by no means limited to the navigation system 100. Instead, it may be so arranged that the map information is acquired from a personal computer.

The map information is distributed from the storage section 440 in the above embodiment. However, the map information may be acquired by searching the map information at a recording medium with the use of a drive and a driver at a personal computer. Namely, the map information may be read from the recording medium removably mounted on the terminal unit 300. With this arrangement, easy utilization of map information and promotion of the usage can be realized. The server unit 400 may only distribute the map information so that each terminal unit 300 searches for a route. With this arrangement, the processing carried out by the coordinate matching section can be performed at each terminal unit 300.

The retrieval of the retrieval information described in the embodiment may be omitted.

The current position recognizer recognizes the current position information based on the data output from the various sensors and the GPS data output from the GPS receiver in the above described embodiment. However, any other arrangement may alternatively be used to recognize the current position of a movable body. As described above, it may recognize pseudo-coordinates position input at the terminal input section 330 as the current position.

The above described embodiment is so configured that several travel routes selected on the basis of the current position information, the destination information and the configuration information are sent to the user. However, it may alternatively be so configured that only one travel routes is sent along with the map information.

The route processor 452 and the coordinates matching section are provided as programs of the CPU 450. However, they may alternatively be provided as hardware such as a circuit board or an element such as a single IC (Integrated Circuit). With the readings from a program or a recording medium, advantages such as the easy handling and promotion of the utilization can be attained.

The terminal unit 300 is provided with a transceiver 310 in the above description. However, the transceiver 310 may be separated from the terminal unit 300 and a mobile phone or a PHS that is connected to the terminal unit 300 may be used as the transceiver 310. In this case, the transceiver 310 is connected to the terminal unit 300 to send/receive information.

The above-described embodiment can be modified appropriately in terms of configuration and operating procedures without departing from the scope of the present invention.

[Advantages of Embodiment]

As described earlier, in the above embodiment, the route processor 452 of the server unit 400 searches for a travel route by using the matching data MM in the map information, on the basis of the current position information and the destination information acquired from the terminal unit 300 over the network 200. The information on the travel route and the matching information MMx containing nodes N and links L representing a road including the travel route are sent to the terminal unit 300 and the terminal unit 300 acquires them. At the terminal unit 300, the guidance providing section performs navigation based on the current position information, the matching mesh information MMx and the information on the travel route acquired from the server unit 400. When the vehicle deviates from the travel route, a travel route for the destination is re-searched by using matching mesh information MMx acquired in advance. With this arrangement, since the server unit 400 needs not to perform rerouting nor to send/receive a signal for the rerouting each time the vehicle deviates from the travel route during the travel, the terminal unit 300 can independently perform rerouting. Thus, navigation based on a new travel route provided by the rerouting is promptly and smoothly acquired and that results in preferable navigation.

What is claimed is:

1. A navigation system comprising:
   a terminal unit; and
   a server unit that stores map information, the server unit searching for a travel route for the terminal unit and sending the searched travel route to the terminal unit over a network so that the terminal unit acquires the sent travel route to navigate a movable body on the basis of the travel route,
   wherein the map information includes matching data that has a plurality of matching mesh information divided into a predetermined area, the matching mesh information containing a plurality of point information each of which has coordinates information and unique point information and represents a predetermined point, and segment information which has unique segment information and connects a pair of the point information, the point information and the segment information representing a road;
   the server unit includes a storage section for storing the map information, an information acquisition section for acquiring current position information on a current position of the movable body and destination information on a destination of the movable body, a search section for searching for a travel route for the movable body by using the matching data on the basis of the current position information and the destination information, and a distributing section for distributing information on the searched travel route along with the matching mesh information containing the point information and the segment information to the terminal unit, the matching mesh information representing a road corresponding to the searched travel route; and
   the terminal unit includes a current position information generator for generating the current position information, a destination information generator for generating the destination information, a receiving section for acquiring the matching mesh information and the information on the searched travel route, a navigation section for navigating the movable body on the basis of the current position information, the acquired matching mesh information and the acquired information on the travel route, and a search-restart section for re-searching for a travel route to the destination by using the matching mesh information when the current position is off the travel route.

2. The navigation system according to claim 1, wherein the map information further includes element data on elements constituting a map for a predetermined area corresponding to the matching data, and display-oriented data having a plurality of display-oriented mesh information divided into a predetermined area;
   the distributing section of the server unit sends the display-oriented data along with the matching mesh data; and
   the terminal unit further includes a display controller for displaying a road of the map on the basis of the point information and the segment information in the matching mesh information on a display section and displaying elements on the basis of the display-oriented data except for the road displayed on the basis of the matching mesh information on the display section.

3. The navigation system according to claim 1, wherein the search-restart section of the terminal unit sends a signal for requesting the server unit to re-search for a travel route when it is determined that that a travel route other than the travel route that has been acquired from the server unit can not be searched.

4. The navigation system according to claim 2, wherein the search-restart section of the terminal unit sends a signal for requesting the server unit to re-search for a travel route when it is determined that that a travel route other than the travel route that has been acquired from the server unit can not be searched.

5. The navigation system according to claim 3, wherein the search-restart section determines that a travel route other than the travel route that has been acquired from the server unit can not be searched when the search-restart section determines that an area represented by the matching mesh information acquired from the server unit does not include a travel route other than the acquired travel route.

6. The navigation system according to claim 4, wherein the search-restart section determines that a travel route other than the travel route that has been acquired from the server unit can not be searched when the search-restart section determines that an area represented by the matching mesh information acquired from the server unit does not include a travel route other than the acquired travel route.

7. A navigation method comprising:

a terminal unit; and a server unit that stores map information, the server unit having a computing section that searches for a travel route for the terminal unit and sends the searched travel route to the terminal unit over a network so that the terminal unit acquires the sent travel route to navigate a movable body on the basis of the travel route, wherein the map information includes matching data that has a plurality of matching mesh information divided into a predetermined area, the matching mesh information containing a plurality of point information each of which has coordinates information and unique point information and represents a predetermined point, and segment information which has unique segment information and connects a pair of the point information, the point information and the segment information representing a road;

the navigation method comprising the steps of:

(a) generating current position information on a current position of the movable body and destination information on a destination of the movable body at the terminal unit to acquire the current position information and the destination information over the network;

(b) searching for a travel route for the movable body on the basis of the acquired current position information and the destination information at the terminal unit by using the matching data;

(c) acquiring the searched travel route and the matching mesh information that includes the point information and the segment information representing a road that corresponds to the travel route at the terminal unit; and (d) navigating the movable body while re-searching a travel route to the destination by the terminal unit on the basis of the current position information, the acquired matching mesh information and information on the acquired travel route with the use of the matching mesh information when the current position is off the travel route.

8. A navigation program stored in a computer-readable recording medium, the program executing a navigation method by a computing section, wherein the navigation method comprises:

a terminal unit; and a server unit that stores map information, the server unit having a computing section that searches for a travel route for the terminal unit and sends the searched travel route to the terminal unit over a network so that the terminal unit acquires the sent travel route to navigate a movable body on the basis of the travel route, wherein the map information includes matching data that has a plurality of matching mesh information divided into a predetermined area, the matching mesh information containing a plurality of point information each of which has coordinates information and unique point information and represents a predetermined point, and segment information which has unique segment information and connects a pair of the point information, the point information and the segment information representing a road;

the navigation method comprising the steps of:

(a) generating current position information on a current position of the movable body and destination information on a destination of the movable body at the terminal unit to acquire the current position information and the destination information over the network;

(b) searching for a travel route for the movable body on the basis of the acquired current position information and the destination information at the terminal unit by using the matching data;

(c) acquiring the searched travel route and the matching mesh information that includes the point information and the segment information representing a road that corresponds to the travel route at the terminal unit; and (d) navigating the movable body while re-searching a travel route to the destination by the terminal unit on the basis of the current position information, the acquired matching mesh information and information on the acquired travel route with the use of the matching mesh information when the current position is off the travel route.

9. A recording medium storing a navigation program in a manner readable by a computing section, wherein the navigation program executes a navigation method by a computing section, the navigation method comprising:

a terminal unit; and a server unit that stores map information, the server unit having a computing section that searches for a travel route for the terminal unit and sends the searched travel route to the terminal unit over a network so that the terminal unit acquires the sent travel route to navigate a movable body on the basis of the travel route, wherein the map information includes matching data that has a plurality of matching mesh information divided into a predetermined area, the matching mesh information containing a plurality of point information each of which has coordinates information and unique point information and represents a predetermined point, and segment information which has unique segment information and connects a pair of the point information, the point information and the segment information representing a road;

the navigation method comprising the steps of:

(a) generating current position information on a current position of the movable body and destination information on a destination of the movable body at the terminal unit to acquire the current position information and the destination information over the network;

(b) searching for a travel route for the movable body on the basis of the acquired current position information and the destination information at the terminal unit by using the matching data;

(c) acquiring the searched travel route and the matching mesh information that includes the point information and the segment information representing a road that corresponds to the travel route at the terminal unit; and
(d) navigating the movable body while re-searching a travel route to the destination by the terminal unit on the basis of the current position information, the acquired matching mesh information and information on the acquired travel route with the use of the matching mesh information when the current position is off the travel route.

* * * * *